United States Patent
Shmuylovich et al.

(10) Patent No.: US 7,899,780 B1
(45) Date of Patent: Mar. 1, 2011

(54) METHODS AND APPARATUS FOR STRUCTURED PARTITIONING OF MANAGEMENT INFORMATION

(75) Inventors: Samuil Shmuylovich, Framingham, MA (US); Anoop George Ninan, Milford, MA (US); Boris Farizon, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 284 days.

(21) Appl. No.: 11/393,111

(22) Filed: Mar. 30, 2006

(51) Int. Cl.
*G06F 7/00* (2006.01)
*G06F 17/00* (2006.01)

(52) U.S. Cl. .......................................... 707/610; 707/614

(58) Field of Classification Search .................. None
See application file for complete search history.

(56) References Cited

U.S. PATENT DOCUMENTS

| | | | |
|---|---|---|---|
| 6,763,347 B1* | 7/2004 | Zhang | 707/2 |
| 6,892,284 B2 | 5/2005 | Ling et al. | |
| 6,934,853 B2* | 8/2005 | Christopherson et al. | 726/6 |
| 7,334,036 B2* | 2/2008 | Ando et al. | 709/224 |
| 7,343,451 B2* | 3/2008 | Suzuki et al. | 711/114 |
| 7,403,987 B1 | 7/2008 | Marinelli et al. | |
| 7,415,586 B2 | 8/2008 | Mimatsu et al. | |
| 7,430,568 B1* | 9/2008 | DeKoning et al. | 707/200 |
| 7,437,386 B2* | 10/2008 | Callahan et al. | 1/1 |
| 2002/0073188 A1* | 6/2002 | Rawson, III | 709/223 |
| 2003/0115218 A1* | 6/2003 | Bobbitt et al. | 707/200 |
| 2003/0217077 A1* | 11/2003 | Schwartz et al. | 707/200 |
| 2004/0267838 A1* | 12/2004 | Curran et al. | 707/204 |
| 2005/0010733 A1 | 1/2005 | Mimatsu et al. | |
| 2005/0262097 A1* | 11/2005 | Sim-Tang et al. | 707/10 |
| 2006/0004765 A1* | 1/2006 | Anderson et al. | 707/10 |
| 2007/0038679 A1 | 2/2007 | Ramkumar et al. | |
| 2007/0067366 A1* | 3/2007 | Landis | 707/205 |
| 2007/0168336 A1* | 7/2007 | Ransil et al. | 707/3 |

FOREIGN PATENT DOCUMENTS

JP 2005-031716 2/2005

* cited by examiner

*Primary Examiner* — Neveen Abel-Jalil
*Assistant Examiner* — Raheem Hoffler
(74) *Attorney, Agent, or Firm* — Krishnendu Gupta; Gerald P. Kazanjian

(57) ABSTRACT

A SAN management agent performs hierarchical based partitioning. Partitions expressed as a hierarchy of related manageable entities allow partitioning based on the relations in the hierarchy. Related manageable entities often trigger updates to database elements common to both of the related manageable entities. The related manageable entities often take the form of a hierarchy (tree) indicative of these relations. Grouping the updates affecting related manageable entities together in the same partition allows the database elements affected by the related updates to occur from a single retrieval of the common database element. By partitioning updates of related manageable entities together, the common database elements are more likely to be paged or cached in memory at the time the update processing updates the common database element. Accordingly, tree-based partitioning identifies relations between manageable entities, and designates related manageable entities by traversing the relations.

18 Claims, 8 Drawing Sheets

US 7,899,780 B1

METHODS AND APPARATUS FOR STRUCTURED PARTITIONING OF MANAGEMENT INFORMATION

BACKGROUND

In a storage area network (SAN), a SAN management application monitors and manages manageable entities in the SAN. The manageable entities include storage arrays, connectivity devices, and hosts. Typically, software components known as agents execute on the hosts for gathering, reporting, and monitoring the manageable entities in the SAN. The manageable entities are responsive to the agents for reporting various status metrics back to the agents and receiving control information from the agents. A management server executes the SAN management application, and oversees the agents. The management server is responsive to a console having a graphical user interface (GUI) for receiving and displaying operator parameters with a SAN operator.

The SAN is therefore an interconnection of manageable entities operative to provide mass data storage and retrieval services to a user community. In the SAN, various data collection and reporting operations occur via the agents and the manageable entities the agents monitor. The data collection and reporting operations gather management information about the SAN. The management information is indicative of operating parameters, including but not limited to physical device usage, logical device allocation across physical devices, redundancy usage (mirroring, shadowing and RAID arrangements), available storage, used storage and archive/backup arrangements. Other types and usage of management information is employable by those skilled in the art of SAN management and control.

SUMMARY

In a storage area network, an interconnection of manageable entities, including storage arrays, connectivity devices (e.g. switches) and host computers (hosts), provide data storage and retrieval services to a user community. Conventional storage area networks accumulate management information corresponding to ongoing activity in the SAN, typically from processing associated with the storage and retrieval services. The storage area network (SAN) therefore includes a set of storage arrays for storing user data, and an interconnection of manageable entities for retrieving and updating the data in response to user requests. The management information typically includes performance and usage metrics indicative of utilization levels, available storage, and usage demands, for example, and may be employed for tracking usage, planning upgrades, forecasting usage trends and distributing demand loads. The SAN gathers the management information from the agents, which are typically implemented as software processes deployed on various hosts throughout the network.

The agents are therefore responsible for monitoring and managing the various manageable entities in the SAN, and are responsive to the SAN management application for reporting management information and receiving administrative commands. Among the manageable entities in the SAN, the storage arrays include a plurality of storage devices, such as disk drives, each of which is itself a manageable entity and operable to generate management information. In a particular storage array, therefore, there are a plurality of storage devices (or storage objects) that generate management information gatherable by the agents. A manageable entity such as a storage array may have other included manageable entities, such as storage devices. The manageable entities included in a so-called "top-level" manageable entity, such as a storage array, define a hierarchy of relations between manageable entities. Therefore, a single top level manageable entity may include many other manageable entities, each potentially causing management information concerning updates to be generated. In a large SAN, the management information gathered by the agents can be substantial, even in a single storage array.

Accordingly, configurations of the invention are based, in part, on the observation that substantial management information gathered by an agent may be cumbersome to process. Often the related data triggers updates to common database elements. However, the updates to the related data may be processed at a later time, triggering additional fetches of the affected database element. Therefore, it is beneficial to group updates pertaining to related manageable entities together, thereby minimizing fetches of common elements by updating common elements in the same fetch, or retrieval operation.

In the SAN, mechanisms for efficiently processing large data sets of management information include change sets and partitioning, discussed further in the following copending U.S. patent applications. Change sets and partitions are employed to handle sparse updates and avoid time and resource consuming full data sets, as discussed further in copending U.S. patent application Ser. No. 10/675,205, filed Sep. 30, 2003, entitled "METHOD AND APPARATUS FOR IDENTIFYING AND PROCESSING CHANGES TO MANAGEMENT INFORMATION", and copending patent application Ser. No. 11/393,110, filed concurrently, entitled "METHODS AND APPARATUS FOR PERSISTING MANAGEMENT INFORMATION CHANGES", both incorporated herein by reference in entirety. Conventional partitioning is discussed further in copending U.S. patent application Ser. No. 11/095,421, filed Mar. 31, 2005, entitled "METHOD AND APPARATUS FOR PROCESSING MANAGEMENT INFORMATION", also incorporated herein by reference in entirety. However, it should be noted that change set processing and partitioning are independent and may be performed independently or in conjunction. Change set processing is an efficient mechanism to process sparse updates, and partitioning effectively handles large information sets. Conventional partitioning identifies a subset, or partition, of a larger data set, and labels the partition accordingly (e.g. 1 of 10, 2 of 10, etc.). The store process may then process incremental partitions, rather than an entire data set, at a particular time to avoid overburdening the store process. Such conventional partitions may be based, for example, on an exemplary or typical data set size, and subdivide the data set accordingly into a particular number of partitions.

Configurations herein substantially overcome configuration issues associated with fixed or static number of partitions by performing hierarchical, or tree-based, partitioning. Related manageable entities often trigger updates to database elements common to both of the related manageable entities. The related manageable entities often take the form of a hierarchy, such as a tree structure, indicative of these relations. Grouping the updates, or management information records, affecting related manageable entities together in the same partition allows the database elements affected by the related updates to occur from a single retrieval of the common database element. By partitioning updates of related manageable entities together, the common database elements are more likely to be paged or cached in memory at the time when the update processing updates the common database element. Accordingly, tree-based partitioning identifies relations between manageable entities, and designates related manageable entities by traversing the relations. A partitioner groups a set of related entities into a partition by selecting a hierarchical subset, or "branch," of the tree, shown graphically in FIG. 4 below. Various tree traversal mechanisms may be employed, with the intent of partitioning dependent, or "child" tree nodes with the parent, as per the relations. Partitioning in this manner makes it unlikely to split updates of related entities across different partitions, then requiring an additional fetch of a database element common to both updates.

In further detail, the method of organizing updates to management information in a storage area network as disclosed in exemplary configurations herein includes identifying update information including a set of updates to management information, in which the update information pertains to manageable entities in a storage area network, and in which each update in the set of updates corresponds to at least one manageable entity. The management information transmitted from an agent to the management application is typically in the form of update records for propagation to the managed object database (MODB 134). The management application includes one or more store processes for processing the partitioned management information (i.e. updates) and writing the updates to the MODB 134. A partitioner identifies groups of manageable entities corresponding to the set of updates, and groups the set of updates into partitions corresponding to the identified groups of manageable entities, such that each partition includes updates affecting database elements corresponding to the manageable entities in a respective identified group. The partitioner effectively performs segregation on the management information to partition the data.

In the exemplary configuration, the partitioner groups updates in the set of updates into a partition of related updates, in which related updates having changes (i.e. database writes to particular database elements) in common with other updates in the partition such that the related updates result in revisions to common database elements. Accordingly, the grouping identifies relations between manageable entities, such that the relations correspond to a likelihood of corresponding updates between the manageable entities included in the relations. Identifying the groups of manageable entities further includes determining relations between manageable entities, in which the related manageable entities have a common database element.

In the exemplary configuration, the relations define a hierarchy of related manageable entities, in which the hierarchy defines relations in a parent/child format. Grouping into partitions further involves identifying child manageable entities of a particular parent manageable entity for inclusion in a particular partition, and including each of the child manageable entities with the parent manageable entity in the particular partition. In particular arrangements, identifying groups of manageable entities includes identifying a top level manageable entity, such that the top level manageable entity is operable to include other manageable entities and is independent of others of top level entities (i.e. is not included in any higher level manageable entities), and traversing relations between the identified top level manageable entity and included manageable entities, such that the relations are indicative of managed objects likely to incur updates from updates to the top level managed object. The grouping may include a plurality of top level managed objects, in which the plurality of top level managed objects define a set of storage devices in a storage array. Therefore, identifying the partitions further includes a dependency (i.e. parent-child) traversal of the hierarchy defined by the relations.

In a particular configuration, updating related manageable entities includes performing updates corresponding to a first manageable entity, such that the update affects a database element, and in which the first manageable entity has relations to a second manageable entity and a third manageable entity. The partitioner performs updates corresponding to the second manageable entity, and performs updates to the third manageable entity without refetching the database element (common database element) that also corresponds to the first manageable entity.

In this manner, updates resulting in a database write corresponding to a particular manageable entity result in an update to a related manageable entity, as defined by the relations, in which the update affects a common database element, such that the updates pertaining to the related manageable entity are operable to be effected in the same database update (i.e. fetch).

It should be noted that change set processing, as discussed in the copending application cited above, is independent from partitioning as discussed herein, is employable in conjunction with, or separate from, such change set processing.

Alternate configurations of the invention include a multiprogramming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system or execution environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Configurations herein substantially overcome configuration issues associated with a fixed or static number of partitions by performing hierarchical, or tree-based partitioning that groups related updates together according to relations in the hierarchy to minimize multiple fetches of affected database elements. Related manageable entities often trigger updates to database elements common to both of the related manageable entities. The related manageable entities often take the form of a hierarchy, such as a tree structure indicative of these relations. Grouping the updates affecting related manageable entities together in the same partition allows the database elements affected by the related updates to occur during the same retrieval of the common database element. By partitioning updates, or management information records, of related manageable entities together, the common database elements are more likely to be paged or cached in memory at the time the update processing updates the common database element. Accordingly, tree-based partitioning identifies relations between manageable entities, and designates related manageable entities by traversing the relations. A partitioner groups a set of related entities into a partition by selecting a "branch," of the tree. Partitioning in this manner makes it unlikely to split updates of related entities across different partitions, requiring an additional fetch of a database element common to both updates.

For example, in a typical storage array, the storage devices (i.e. disk drives) in the storage array connect to ports on front-end adaptors (FE adaptors). A front end (FE) mapping defines the relations between the ports on the FE adaptors and the storage devices to which they connect. Conventional grouping may, for example, include updates, or management information records, pertaining to FE adaptors in one partition, and updates pertaining to front end mappings to storage devices in another, since storage devices are at a different level of the tree. Such processing may result in the database element including the front end mapping to be retrieved first when the partition including FE adaptors is processed, and again when the partition including updates to storage devices is processed. In contrast, configurations herein partition updates pertaining to a FE mapping in the same partition as updates pertaining to the storage devices associated with that FE mapping, allowing the front end mapping to be updated during a single fetch of the corresponding database element. Viewed graphically, the processing techniques discussed further below result in processing according to a traversal following the dependencies of the relation tree of manageable entities, rather than processing following the siblings according to the type, size, or name of the manageable entity.

Figure 1:
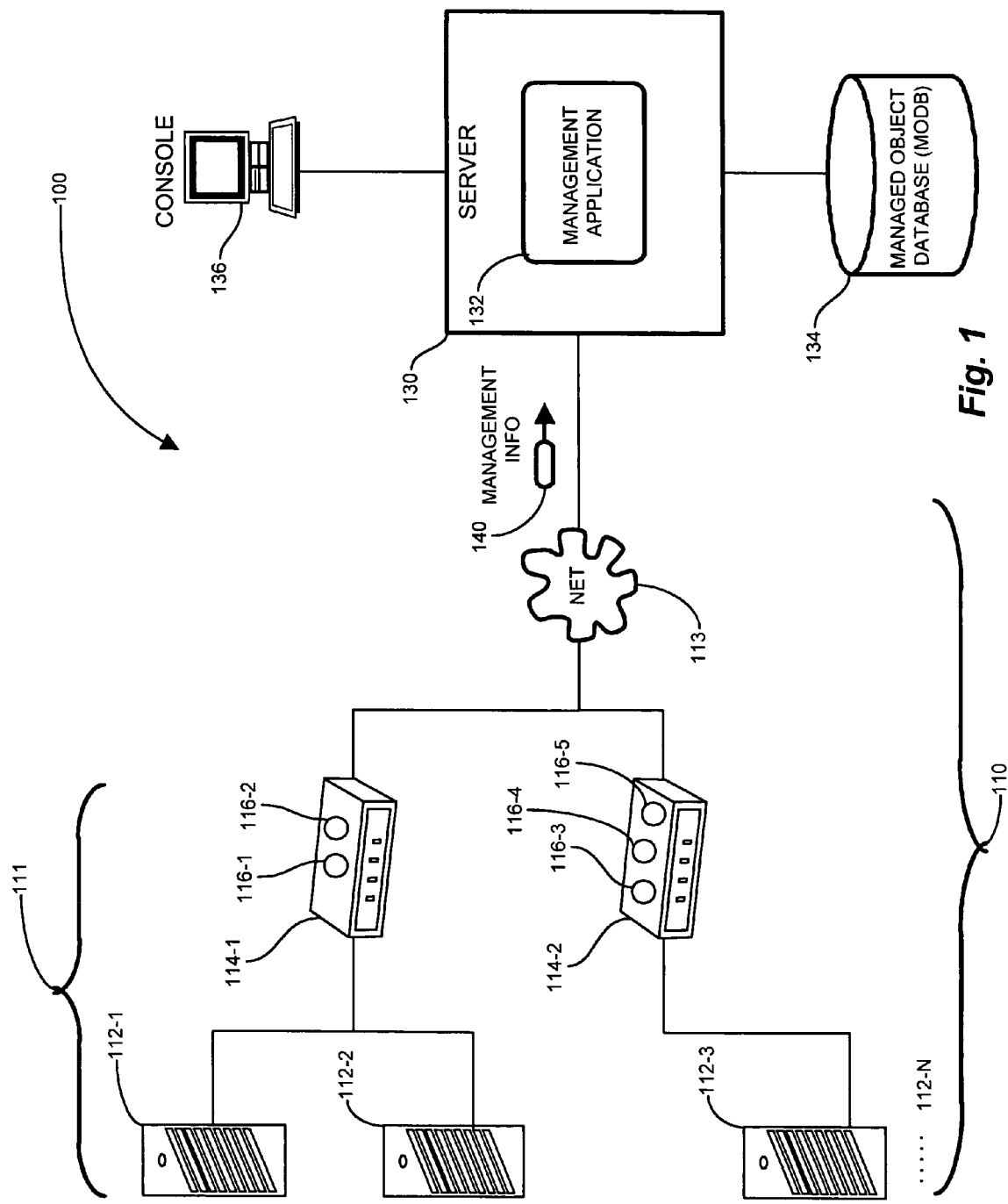
FIG. 1 is a context diagram of an exemplary managed information environment suitable for use with the present invention.

In a storage area network, management information is gathered by techniques such as those disclosed in copending U.S. patent application Ser. No. 11/393,110 entitled "METHODS AND APPARATUS FOR PERSISTING MANAGEMENT INFORMATION CHANGES," cited above. In the exemplary configuration, the storage arrays are Symmetrix storage arrays, marketed commercially by EMC Corporation of Hopkinton, Mass., assignee of the present application. FIG. 1 is a context diagram of an exemplary managed information environment 100 suitable for use with such an exemplary configuration. Referring to FIG. 1, the environment includes a storage area network 110 interconnecting manageable entities 111. The manageable entities 111 include storage arrays 112-1 . . . 112-N (112, generally), for storing user data, and host computers 114-1 . . . 114-2 (114 generally) for transporting user data via the SAN 110 and gathering management information 140 about the SAN. In particular, the host computers 114 (hosts) connect to particular storage arrays 112 and execute agents 116-1 . . . 116-5 (116 generally) for gathering management information. The agents 116 are software processes operable to gather particular types of data from specific devices, such as the storage arrays 112, to which they connect. In the exemplary configuration, as indicated above, the storage arrays 112 may be Symmetrix storage arrays, marketed commercially by EMC corporation. Alternate configurations may include other devices such as different type of storage arrays or manageable entities 111.

The agents 116 gather management information 140 for transmission to a management application 132 executing on a server 130, accessible via a network 113. The management information 140 is typically in the form of update records (updates), and includes administrative data pertaining to the storage arrays 112, such as usage metrics (available, allocated and free storage), access frequency and volume, user access trends, and other data pertinent to performance, availability and capacity of the respective storage arrays 112. A managed object database 134 connects to the server 130 for storing the management information 140, and a user console 134 also connects to the server 130 for invoking the management application 132 to provide reports and other output from the stored management information 140. In this manner, a SAN 110 operator may employ the console 136 to gather reports concerning the health and performance of particular storage arrays 12 over time from the management information 140 stored in the managed object database 134.

Figure 2:
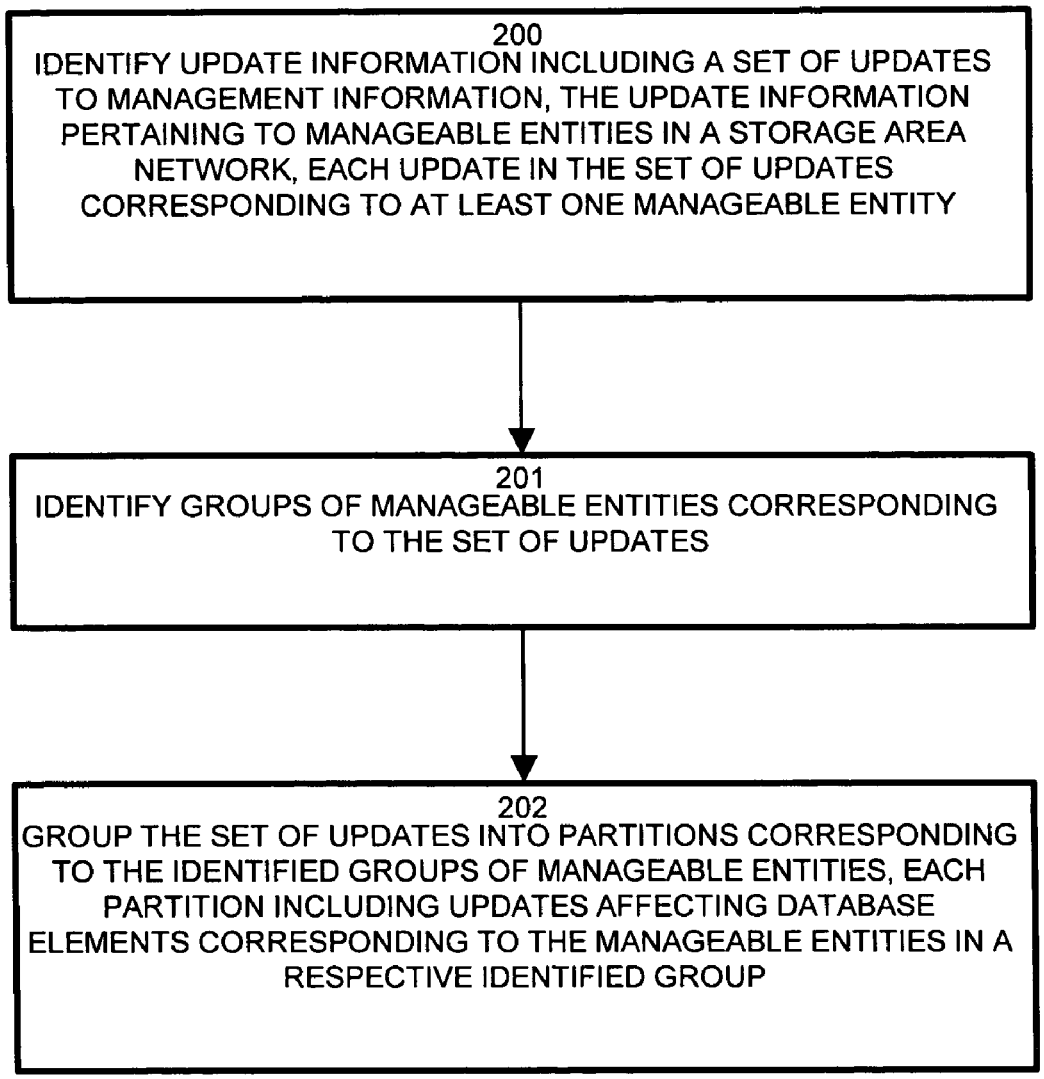
FIG. 2 is a flowchart of partition processing in the environment of FIG. 1.

FIG. 2 is a flowchart of database partitioning in the environment of FIG. 1. Referring to FIGS. 1 and 2, the method of organizing updates to management information 140 in a storage area network as disclosed herein involves, at step 200, identifying update information including a set of updates to management information 140, in which the update information pertains to manageable entities 111 in a storage area network 110, such that each update in the set of updates corresponds to at least one manageable entity. Thus, the updates to the management information 140 take the form of a set of updates, or database modifications (writes). Each update is attributable to a particular manageable entity 111, such as a storage device (disk drive), port, or front end (FE) adaptor, as will become apparent in the discussion below. The agent 116 identifies groups of manageable entities 111 corresponding to the set of updates, as shown at step 201, such that each manageable entity group includes updates that affect database elements pertaining to manageable entities 111 in that group. Therefore, the agent 116 groups the set of updates into partitions (144, FIG. 3 below) corresponding to the identified groups of manageable entities 111, such that each partition 144 includes updates affecting database elements corresponding to the manageable entities 111 in a respective identified group, as depicted at step 202. As will now be discussed further below, the manageable entity groups (180, FIG. 4) include related manageable entities 111, as determined by a hierarchy of relations between the manageable entities 111.

Figure 3:
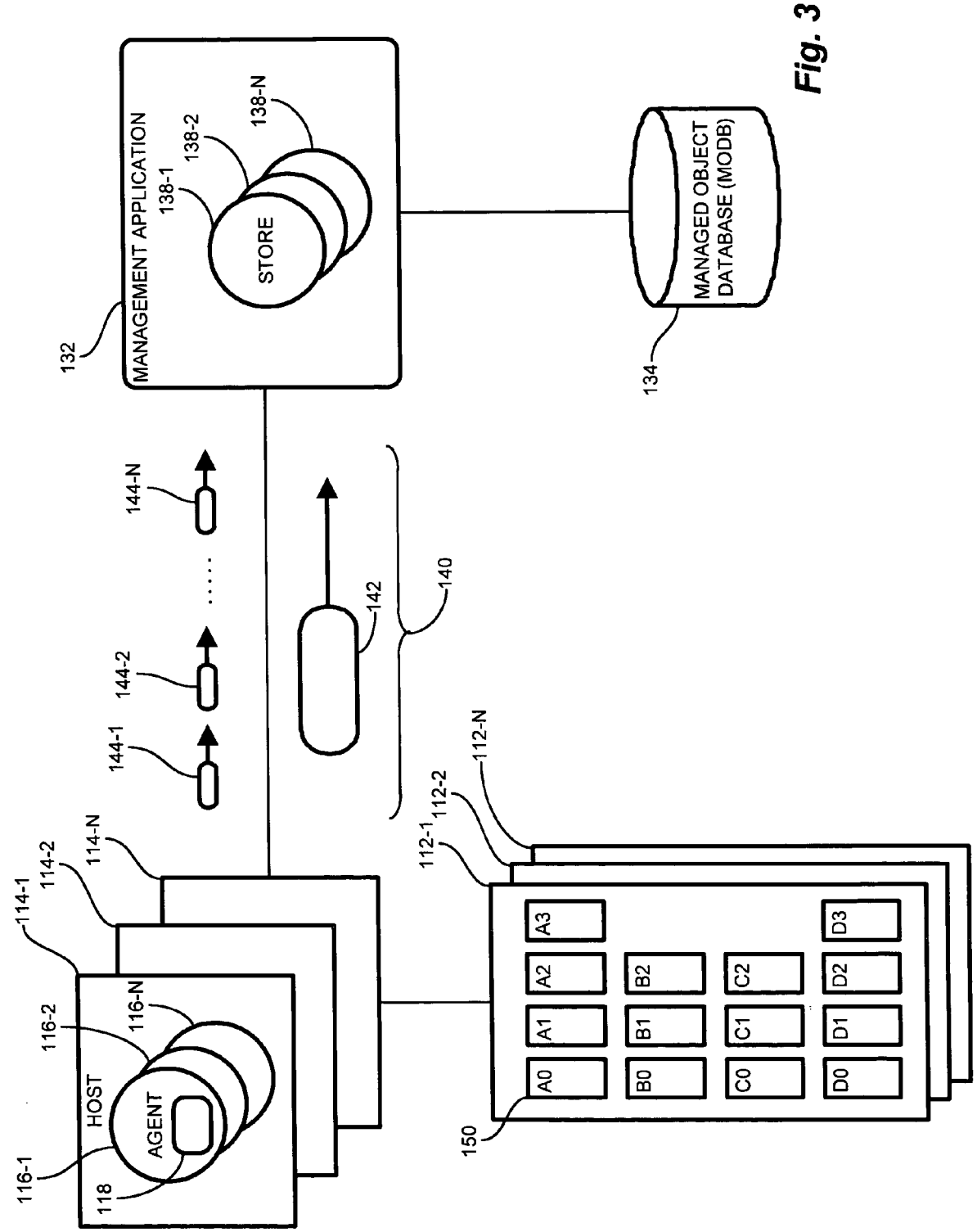
FIG. 3 illustrates an example configuration of an agent and a store process gathering management information from a storage array in accordance with a particular exemplary embodiment used illustratively herein for transmitting partitions.

FIG. 3 illustrates an example configuration of an agent 116 and a store process 138 gathering management information 140 from a storage array 112 in accordance with a particular exemplary embodiment used illustratively herein for transmitting partitions 144. Referring to FIGS. 1 and 3, the exemplary configuration includes a plurality of agents 116-N on a plurality of hosts 114-N gathering management information 140 for each of a plurality of storage arrays 112. Generally, therefore, each storage array 112 is responsive to at least one agent 116 for gathering management information 140. The management application 132 has one or more store processes 138-1.138-N (138 generally) for receiving gathered management information 140 from the agents 116. As indicated in the copending applications cited above, it is beneficial to meter or throttle the management information 140 sent from the agents 116 to avoid burdening or queuing excessive amounts of management information 140 at the store process 138. It is further beneficial to group, or partition, the updates in the management information 140 according to the database elements (i.e. records, fields, or pages) they update, thus minimizing the required fetches of the database elements by the store processes 138.

Accordingly, configurations herein format and transmit the management information in a series of partitions 144-1 . . . 144-N according to a hierarchy of relations between the manageable entities 111 to which the management information 140 corresponds. In the exemplary arrangement, the management information 140 includes updates to a particular storage device 150 within a storage array 112. Each partition 144 includes a subset of updates, or records, included in a set of management information 140, typically representative of the entire storage array 112. Therefore, agents 116 examine the quantity, or size, of the management information 140, and determine whether to send a single data set 142 or a series of partitions 144, each including updates representing a subset of the management information 140.

Each of the storage arrays 112 from which agents 116 gather management information includes a plurality of storage devices 150-1 . . . 150-N (150 generally), which in the exemplary configuration are disk drives. Alternatively, other storage objects may be employed as storage devices, such as non-mechanical memory arrangements (e.g. flash memory, or other solid state devices). The management information 140 includes updates corresponding to a particular storage device 150. Accordingly, the updates are organized according to the storage device 150 to which they correspond. A partitioner 118 in the agent 116 groups the updates according to a subset, or partition 144, of storage devices 150 including the updates to that subset of storage devices 150. The agents 116 transmit the updates corresponding to a particular subset of storage devices 150 as a partition 144. The partitioner 118 subdivides the storage devices 150 in the storage array 112 into groups of manageable entities 150, each including updates corresponding to the related manageable entities 150 (i.e. the manageable entities in the group).

The related manageable entities 111 are such that they will frequently trigger complementary updates concerning other related manageable entities 111, and therefore related manageable entities will cause updates to the same, or common, database elements. Grouping updates of related manageable entities in the same partition 144 allows the common database element 190 (FIG. 4) to be fetched once and processed with that partition 144. In an exemplary configuration, now discussed with respect to FIG. 4, a hierarchical tree 102 of manageable entities 112, 150 and 170 denotes relations 172 between related manageable entities 111. Sets of related manageable entities form manageable entity groups 180 upon which updates pertaining to manageable entities 111 in the manageable entity group are partitioned. The partitioner 118 may employ alternate grouping mechanisms to denote the storage devices included in a partition, such as an enumerated list of device IDs, for example.

Figure 4:
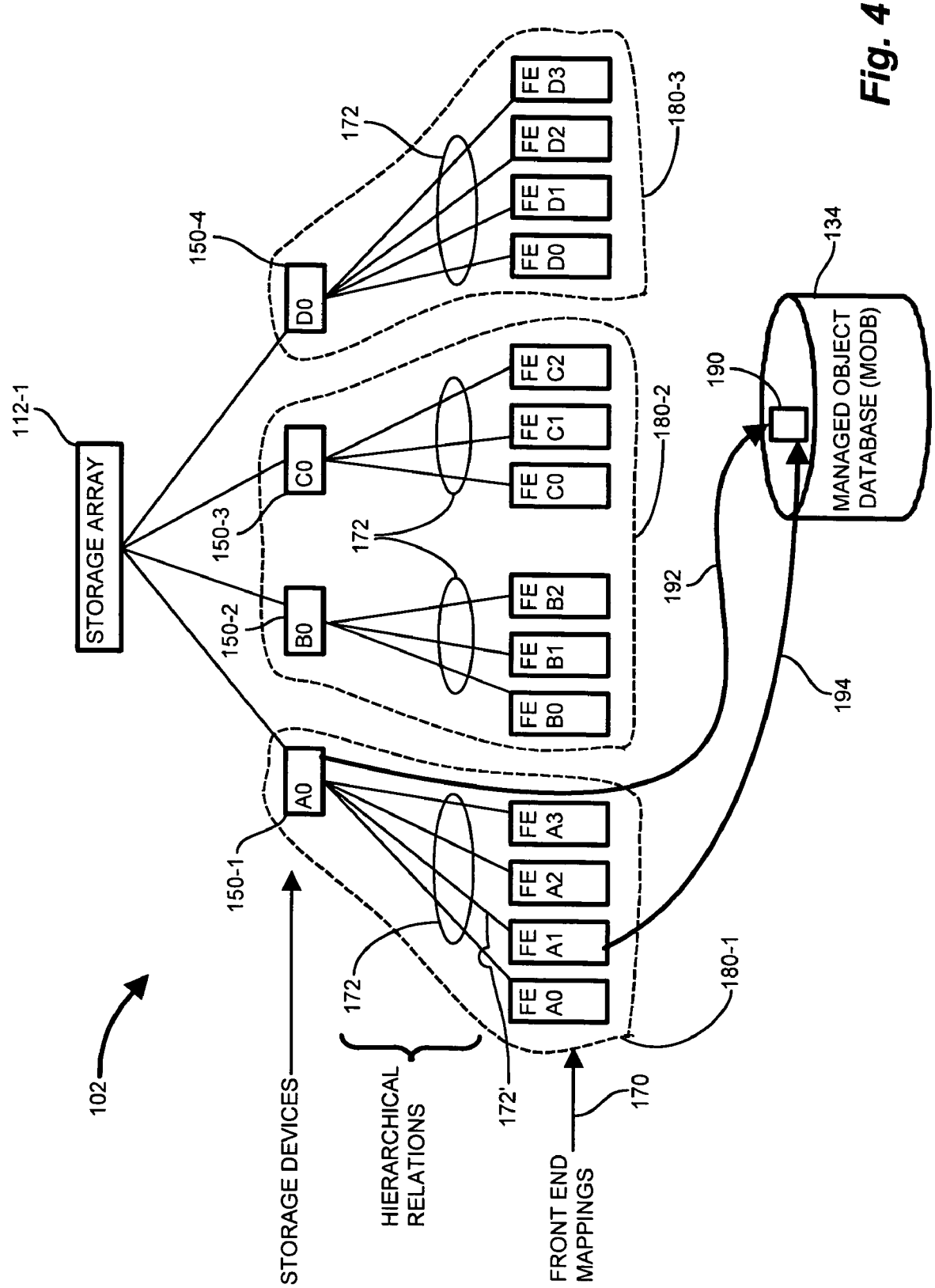
FIG. 4. is a partition grouping according to a hierarchy of relations of the storage array of FIG. 3.
Figure 5:
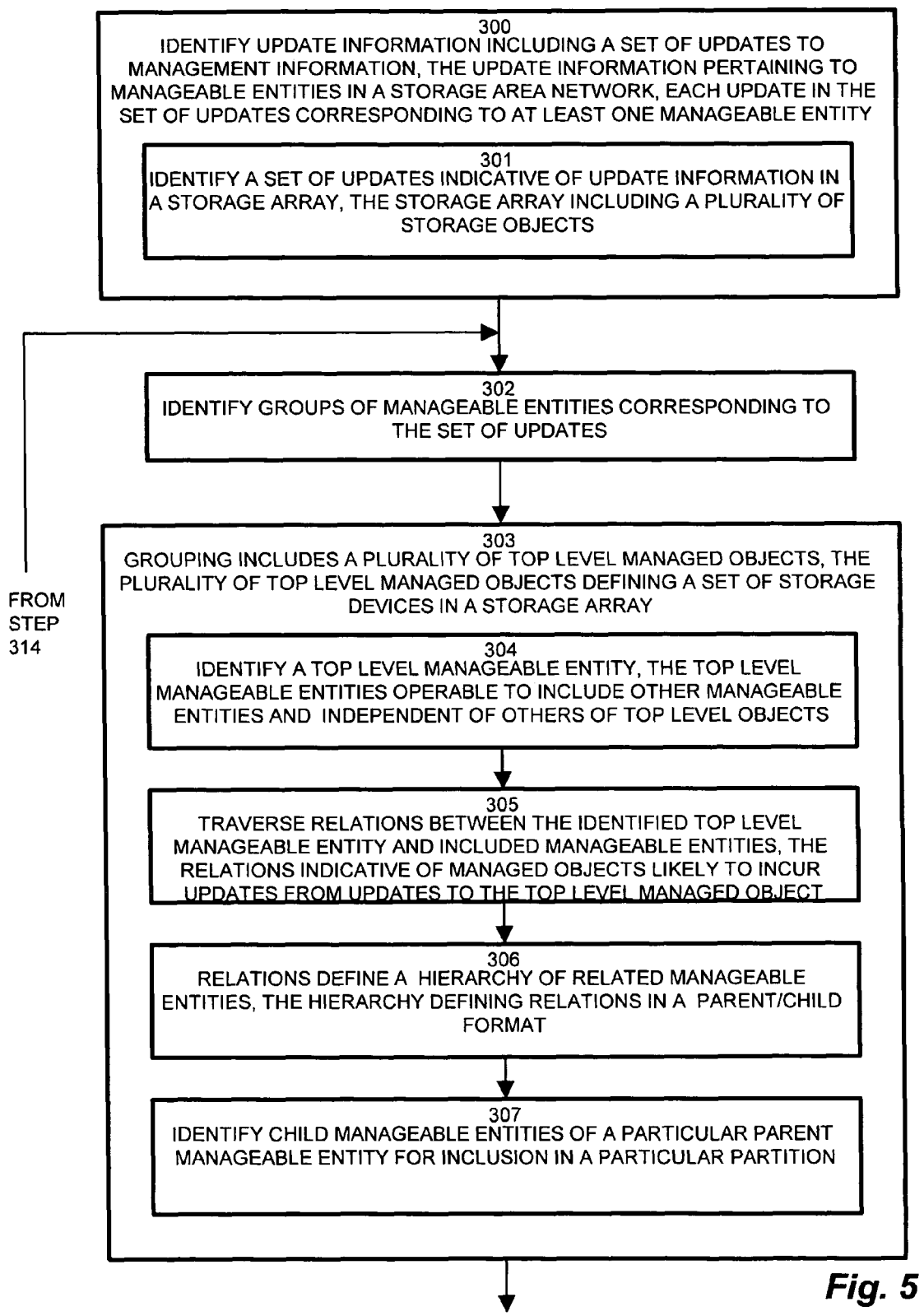
FIGS. 5-8 are a flowchart of partition processing in the configuration of FIG. 3 according to the hierarchy of FIG. 4.
Figure 6:
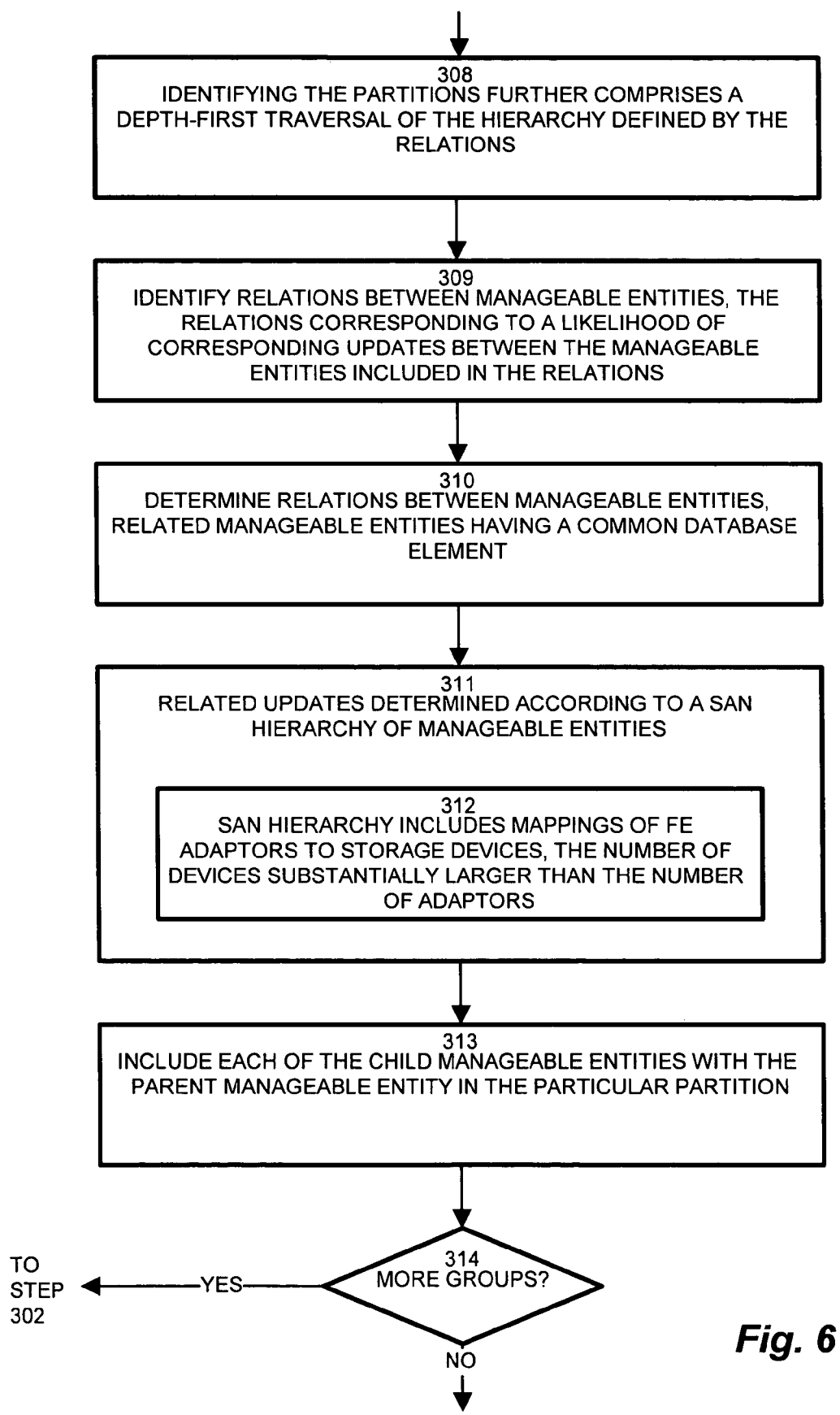
Figure 7:
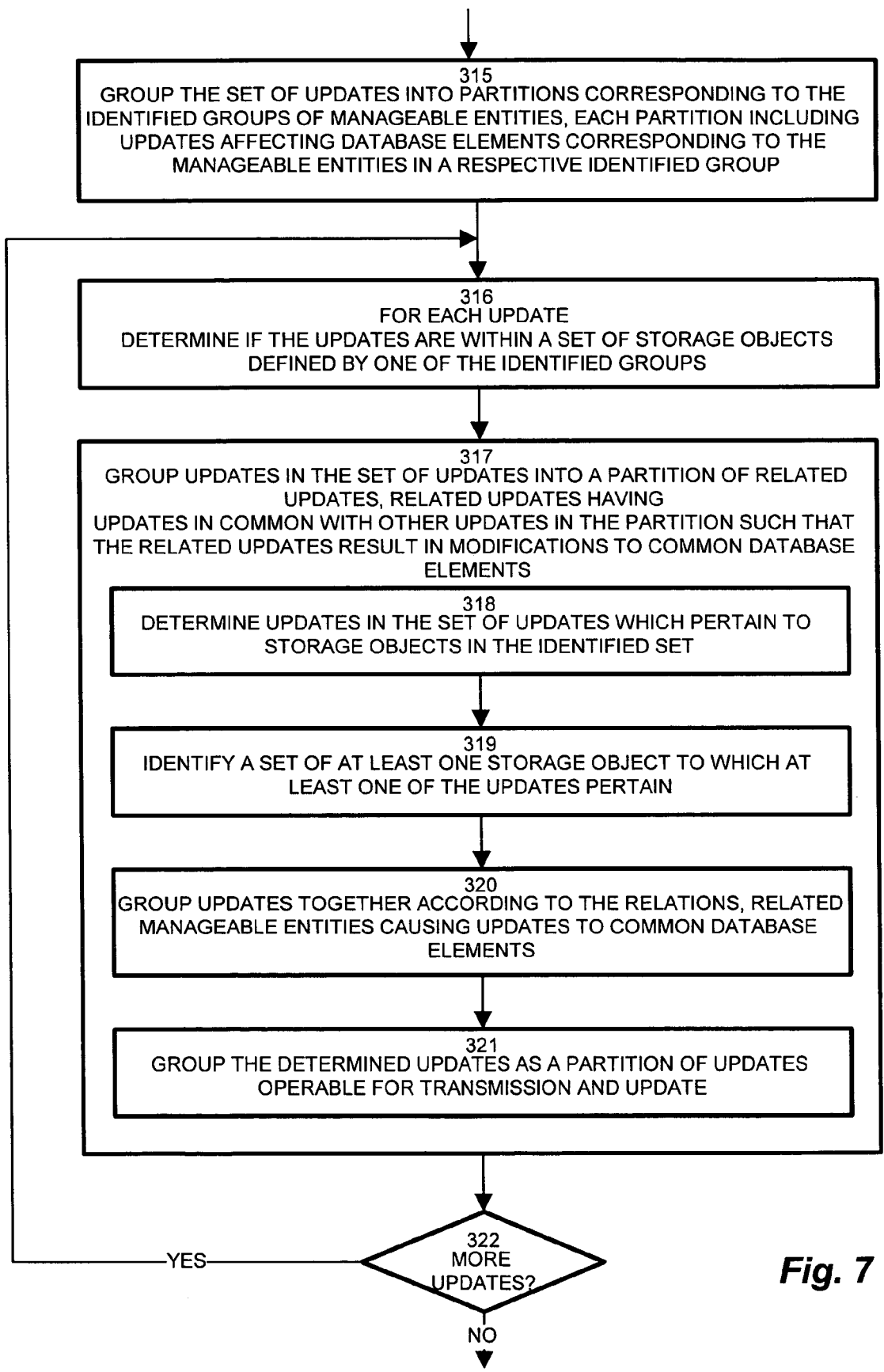
Figure 8:
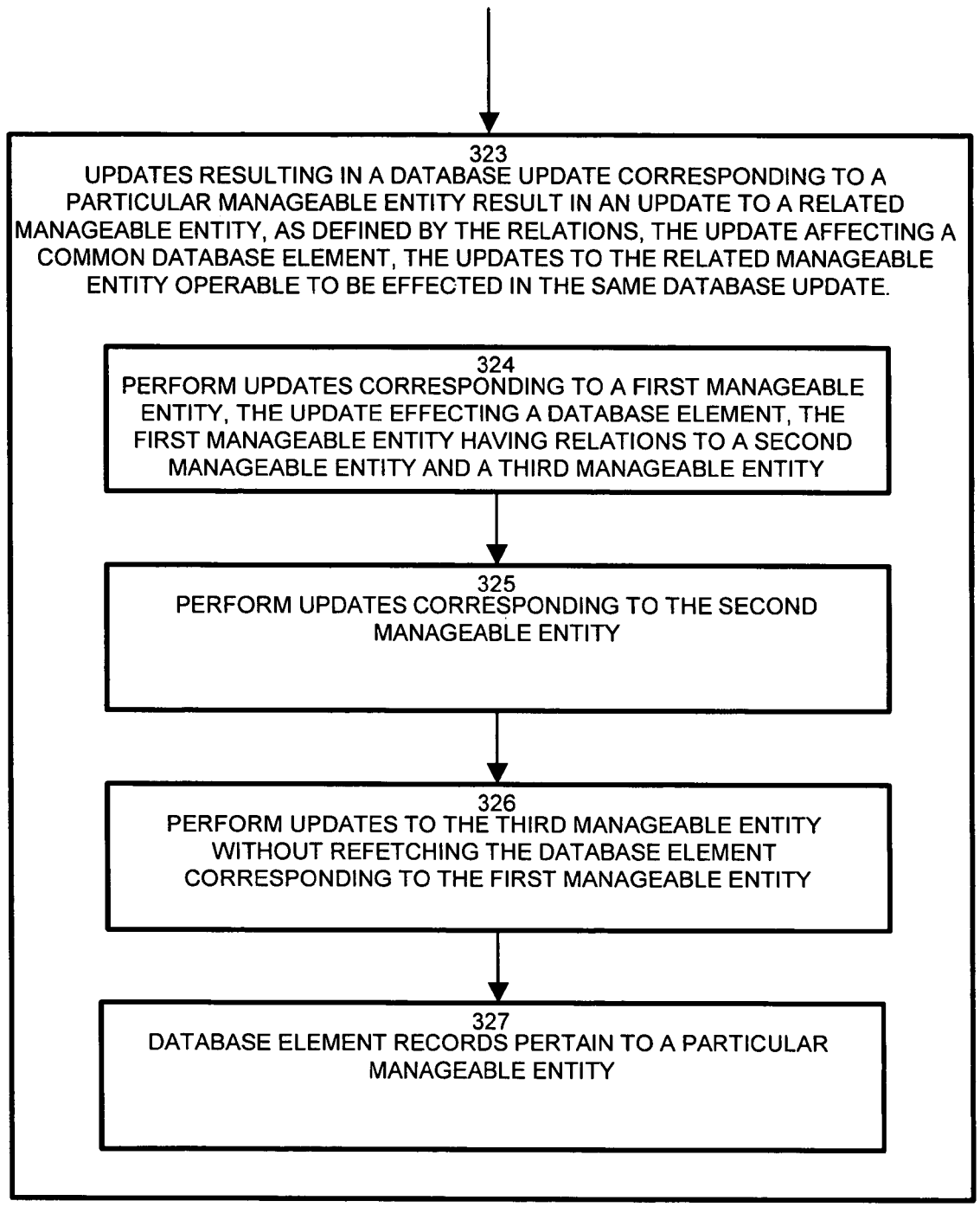

FIG. 4. is a partition grouping according to a hierarchy 102 of relations 172 of the storage array of FIG. 3. Referring to FIG. 4, the exemplary storage array 112-1 includes storage devices (150) A0, B0, C0 and D0 having front end (FE) mappings 170 to ports. In a storage array 112, front end adaptors (not specifically shown) each have a number of ports. The storage devices 150 connect to the ports. The interconnections between the ports and the storage devices 150, therefore, occur via front end mappings 170, and define relations 172 between the respective manageable entities 111, specifically front end (FE) mappings 170 and storage devices 150, in the exemplary configuration shown. Only the first column A0 . . . D0 (FIG. 3) of storage devices 150 is shown for illustrative purposes, as the number of relations 172 may rapidly become substantial. The exemplary configuration shows the partitions 144 derived from groups 180 of manageable entities based on a manageable entity 111 at a higher hierarchy level (i.e. storage devices 150) and related manageable entities 111 at a lower level (i.e. FE mappings 170). The relations 172 from an storage device 150 to the respective FE mapping 170 define a managed entity grouping 180-1 . . . 180-3 (180 generally), including related manageable entities 111 for inclusion in a partition 144. In the example shown, A0 has relations 172 to FE mappings FEA0-FEA3, forming a partition 144 defined by manageable entity grouping 180-1. Similarly, storage devices B0 and C0 have relations 172 to FE mappings FEB0 . . . FEB2 and FEC0 . . . FEC2 (170), respectively, and define manageable entity grouping 180-2, forming another partition 142. Manageable entity grouping 180-3 includes D0 and FE mappings FED0 . . . FED3 (170). It should be noted that the groups 180 may be derived from a range of manageable entities, such as group 180-2, derived from storage arrays B0 . . . C0. Such range based partitioning is discussed further in copending U.S. patent application entitled "METHODS AND APPARATUS FOR PARTITIONING MANAGEMENT INFORMATION" (Ser. No. 11/393,641), filed concurrently, incorporated herein by reference.

In the example shown, database element 190 includes management information 140 pertaining to both FEA1, shown by arrow 194, and storage device A0, shown by arrow 192. Accordingly, updates to the front end mapping relation 172' between FEA1 and A0, for example, such as a port change (each FE Adaptor has a number of ports, thus allowing for multiple FE mappings 170 per storage array 150) triggers updates related to both FEA1 and A0. Arranging a partition 144 including manageable entity group 180-1 ensures that database element 190 is fetched once, and incurs processing with respect to FEA1 and A0 updates while stored in memory, rather then requiring multiple fetches of element 190 if updates pertaining to FEA1 and A0 fell into different partitions 144. The relations 172 presented by front end mappings 170 is exemplary; other relations 172 between manageable entities 111 may be employed for identifying manageable entity groups 180 and partitioning accordingly.

FIGS. 5-8 are a flowchart of partitioning 144 in the configuration of FIG. 3. The flowchart depicts an exemplary operations flow of configurations discussed herein. Not all configurations need necessarily perform all steps and refinements to steps indicated in the flowchart. Further, these steps are intended to convey a logical, illustrative expression of the operations performed, and not necessarily an optimized detail of computing functions which a set of programmed logic instructions (i.e. source code) may implement. Referring to FIGS. 3-8, the partitioner 118 processes partitions 144 according to the hierarchy 102 of relations 172 shown in FIG. 4 by identifying update information including a set of updates to management information, in which the update information pertains to manageable entities 111 in the storage area network 110. Each update in the set of updates corresponds to at least one manageable entity 111, as depicted at step 300. This includes, in the exemplary configuration, employing a storage array 112 in a SAN 110, identifying a set of updates indicative of update information in a storage array 112, in which the storage array 112 includes a plurality of storage objects (i.e. disk drives), as depicted at step 301. The partitioner 118 identifies groups 180 of manageable entities 111 corresponding to the identified set of updates, as disclosed at step 302. The exemplary storage array 112, which is itself a manageable entity 111, includes storage devices 150, front end (FE) adaptors 160, and ports on the FE adaptors 160 (not specifically shown), each of which is also a manageable entity 111. In the exemplary SAN 110 context, the manageable entities 111 are managed objects that are responsive to the management application 132. The storage array 112 may also be considered a top level manageable entity, because it includes other manageable entities.

The partitioner 118 groups the manageable entities 111, such that the grouping includes a plurality of top level managed objects (i.e. the storage array 112), such that the plurality of top level managed objects define a set of storage devices 150 included in storage array 112, as depicted at step 303. The partitioner 118 identifies the groups 180 of manageable entities 111 by identifying a top level manageable entity (storage array 112, in the exemplary arrangement), in which the top level manageable entity 111 is operable to include other manageable entities 111 and is independent of others of top level manageable entities, as depicted at step 304. Since the top level is independent, it does not have direct relations to other storage arrays 112, and therefore any number of top level manageable entities may be included in a manageable entity group 180. For the top level manageable entities 111, the partitioner 118 traverses relations 172 between the identified top level manageable entity 112 and included manageable entities (i.e. storage devices 150), such that the relations 172 are indicative of manageable entities likely to incur updates from updates to the top level manageable entities, as shown at step 305. Similarly, the forwarding engines 160 may be considered top level manageable entities with respect to the storage devices 150 they serve. The relations 172 define a hierarchy 102 of related manageable entities, as depicted at step 306, such that the hierarchy defines relations in a parent/child format, as shown in FIG. 4. The partitioner 118 identifies child manageable entities 111 of a particular parent manageable entity 111 for inclusion in a particular partition 144, as shown at step 307, by including the children of one or more top level manageable entities 111 in a manageable entity group 180.

Once identifying the top level manageable entities 111 for inclusion in a manageable entity group 180, therefore, identifying the partitions 144 includes a depth-first traversal of the hierarchy 102 defined by the relations 172, as depicted at step 308. The grouping identifies relations 172 between manageable entities (storage arrays 112 and storage devices 150, in the exemplary configuration), such that the relations 172 correspond to a likelihood of corresponding updates between the manageable entities 111 included in the relations 172, as depicted at step 309. In other words, the partitions 144 need not be rigidly associated with particular database elements 190; rather, placing related entities in the same partition 144 increases the likelihood that the common database element 190 will be in memory or in a cache at the time of a successive update. Accordingly, identifying the groups of manageable entities 180 further includes determining relations 172 between manageable entities, such that related manageable entities have a common database element 190, as disclosed at step 310. The partitioner 118 therefore determines related updates according to the SAN hierarchy 102 of manageable entities 111, as depicted at step 311. The SAN hierarchy 102, in the exemplary arrangement, includes mappings of FE adaptors 160 to storage devices 150 (i.e. so called "front end mappings") in which the number of storage devices 150 is substantially larger than the number of adaptors 160, as depicted at step 312. Since the number of storage devices 150 may be large, conventional grouping according to device type makes it more likely that upon processing updates pertaining to all of the storage arrays 112, database elements 190 pertaining to front end mappings 170 are likely to have been purged from main memory and cache areas, and therefore require refetching. Thus, the partitioner 118 includes each of the child manageable entities with the parent manageable entity in the particular partition 144, as shown at step 313. A check is performed, at step 314, to determine if there are additional manageable entity groups 180 for enumeration as a partition 144, and control reverts to step 303 accordingly.

For each manageable entity group 180, the partitioner 118 groups the set of updates into partitions 144 corresponding to the identified groups of manageable entities 180, such that each partition 144 includes updates affecting database elements 190 corresponding to the manageable entities in the respective identified group 190. The partitioner 118 then, for each update, determines if the updates are in a set of storage objects 150 defined by one of the identified groups 180, as depicted at step 316, and for each manageable entity group 180, groups the updates in the set of updates into a partition 144 of related updates, in which related updates have changes, or DB writes, in common with other updates in the partition such that the related updates result in writes to common database elements 190, as shown at step 317. Partitions may be computed to be of a similar size, although the sizes of individual partitions need not be identical and may vary.

Therefore, building the transmittable partitions 144 from the manageable entity groups 180 defined above involves determining updates in the set of updates which pertain to storage objects 150 in the identified set of manageable entities 180, as disclosed at step 318. The partitioner 118 identifies a set of at least one storage object 150 to which at least one of the updates pertain, as shown at step 319, and groups the updates together according to the relations 172, such that related manageable entities are those causing updates to common database elements 190, as shown at step 320. Therefore, each update is placed in a corresponding partition 144 by identifying the manageable entity 111 to which it pertains and storing it in the partition 144 corresponding to that manageable entity group 180. The partitioner 118 therefore groups the determined updates as a partition 144 of updates operable for transmission and update, as depicted at step 321. In other words, the partitioner 118 builds a partition 144 for each manageable entity group 180. A check is performed, at step 322, to determine if there are additional updates to place into partitions 144, and control reverts to step 316 accordingly.

The agent 116 transmits the resulting partitions 144 to the store process 138. The resulting partitions 144 ensure that updates resulting in a database update corresponding to a particular manageable entity 111 result in an update to a related manageable entity 111, as defined by the relations 172, in which the update affects a common database element 190, such that the updates to the related manageable entity 111 are operable to be effected in the same database update, as depicted at step 323. The store process 138 processes the updates, in which updating related manageable entities, includes performing updates corresponding to a first manageable entity, the update affecting a database element 190, the first manageable entity having relations to a second manageable entity and a third manageable entity, as shown at step 324. The store process 138 then performs updates corresponding to the second manageable entity, as disclosed at step 325, and performing updates to the third manageable entity without refetching the database element 190 corresponding to the first manageable entity, as depicted at step 326. Upon receipt by the store process 138, an identifier of the manageable entity concerned, such as a device ID, are employed to retrieve the management information records for update. In the exemplary configuration, a SQL (Structured Query Language) syntax is employed for accessing the managed object database (MODB) 134. In other words, the store process retrieves records based on the storage device IDs in the range of the partition. Alternate storage and retrieval indices may be employed in other configurations. Upon receiving a partition 144, the store process 138 queries the MODB 134 specifying the device IDs in the range called for by the partition ID. In contrast, conventional partitions format a SQL query targeting the partition ID, already stored with the desired records. Further details are provided in the copending application "METHODS AND APPARATUS FOR PARTITIONING MANAGEMENT INFORMATION" cited above.

In the exemplary configuration, therefore, the database elements 190 are records pertaining to a particular manageable entity, such as an FE mapping 170, as shown at step 327. Alternate configurations, however, encompass updates pertaining to other types of manageable entities 111 in a hierarchical arrangement 102.

Those skilled in the art should readily appreciate that the programs and methods for hierarchical partitioning of management information updates as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for hierarchical partitioning of management information updates has been particularly shown and described with references to embodiments thereof, it will be understood by those skilled in the art that various changes in form and details may be made therein without departing from the scope of the invention encompassed by the appended claims.

What is claimed is:

1. A computer implemented method of organizing updates to management information in a storage area network comprising:

identifying update information including a set of updates to management information, the update information pertaining to manageable entities in a storage area network (SAN), each update in the set of updates corresponding to at least one manageable entity from a plurality of independent top level managed objects;

identifying groups of manageable entities corresponding to the set of updates;

grouping the set of updates, to storage objects from the plurality of independent top level managed objects, into partitions corresponding to the identified groups of manageable entities, each partition including updates affecting database elements corresponding to the manageable entities in a respective identified group, grouping including grouping updates in the set of updates into a partition of related updates, the related updates having changes in common with other updates in the partition such that the related updates result in writes to common database elements, wherein the partition includes entries of SAN manageable entities in the same hierarchy according to tree based partitioning and wherein grouping identifies relations between manageable entities and wherein updates resulting in a database modification corresponding to a particular manageable entity result in an update to a related manageable entity, as defined by the relations, the update affecting a common database element, the updates to the related manageable entity operable to be affected in the same database update;

transmitting each of the partitions independently of the other partitions according to a hierarchy of relations between the manageable entities; and updating a SAN managed object database (MODB) using at least one group of partitioned updates.

2. The method of claim 1 wherein the relations corresponding to a likelihood of corresponding updates between the manageable entities included in the relations.

3. The method of claim 2 wherein identifying the groups of manageable entities further comprises determining relations between manageable entities, related manageable entities having a common database element.

4. The method of claim 3 wherein updating related manageable entities includes:

performing updates corresponding to a first manageable entity, the update affecting a database element, the first manageable entity having relations to a second manageable entity and a third manageable entity;

performing updates corresponding to the second manageable entity; and performing updates to the third manageable entity without refetching the database element corresponding to the first manageable entity; and minimizing fetches of common database elements by updating common database elements in the same fetch.

5. The method of claim 3 wherein the relations define a hierarchy of related manageable entities, the hierarchy defining relations in a parent/child format, grouping into partitions further comprising:

identifying child manageable entities of a particular parent manageable entity for inclusion in a particular partition; and including each of the child manageable entities with the parent manageable entity in the particular partition.

6. The method of claim 5 wherein identifying groups of manageable entities further comprises:

identifying a top level manageable entity, the top level manageable entity operable to include other manageable entities and independent of others of top level manageable entities; and traversing relations between the identified top level manageable entity and included manageable entities, relations indicative of managed objects likely to incur updates from updates to the top level manageable entity.

7. The method of claim 6 wherein the plurality of top level managed objects define a set of storage devices in a storage array.

8. The method of claim 5 wherein identifying the partitions further comprises a depth-first traversal of the hierarchy defined by the relations.

9. A computer program product having a computer readable storage medium operable to store computer program logic embodied in computer program code encoded thereon for an agent for organizing updates to management information in a storage area network comprising:
   computer program code for an interface to a manageable entity operable to identify update information including a set of updates to management information, the update information pertaining to manageable entities in a storage area network, each update in the set of updates corresponding to at least one manageable entity;
   computer program code for a hierarchical set of relations operable to identifying groups of manageable entities corresponding to the set of updates;
   computer program code for a partitioner operable to group the set of updates into partitions corresponding to the identified groups of manageable entities, each partition including updates affecting database elements, grouping including grouping updates in the set of updates into a partition of related updates, the related updates having changes in common with other updates in the partition such that the related updates result in writes to common database elements; corresponding to the manageable entities in a respective identified group wherein the partition includes entries of SAN manageable entities in the same hierarchy according to tree based partitioning and wherein grouping identifies relations between manageable entities and wherein updates resulting in a database modification corresponding to a particular manageable entity result in an update to a related manageable entity, as defined by the relations, the update affecting a common database element, the updates to the related manageable entity operable to be affected in the same database update;
   computer program code for transmitting each of the partitions independently of the other partitions according to a hierarchy of relations between the manageable entities; and
   computer program code for updating a SAN managed object database (MODB) using at least one group of partitioned updates.

10. The product of claim 9 wherein the partitioner is further operable to group updates in the set of updates into a partition of related updates, related updates having modifications in common with other updates in the partition such that the related updates result in writes to common database elements.

11. The product of claim 10 wherein the partitioner is operable to identify the relations between manageable entities, the relations corresponding to a likelihood of corresponding updates between the manageable entities included in the relations, wherein related manageable entities have a common database element.

12. The product of claim 11 further comprising an interface to a management application, the management application operable to update database elements pertaining to related manageable entities by:

performing updates corresponding to a first manageable entity, the update affecting a database element, the first manageable entity having relations to a second manageable entity and a third manageable entity;

performing updates corresponding to the second manageable entity; and performing updates to the third manageable entity without refetching the database element corresponding to the first manageable entity.

13. The product of claim 9 wherein the relations define a hierarchy of related manageable entities, the hierarchy defining relations in a parent/child format, the partitioner further operable to group into partitions further comprising:
   identifying child manageable entities of a particular parent manageable entity for inclusion in a particular partition; and
   including each of the child manageable entities with the parent manageable entity in the particular partition.

14. A method of processing updates to management information in a SAN comprising:
   identifying a set of updates indicative of update information in a storage array, the storage array including a plurality of storage objects;
   identifying a set of at least one storage object to which at least one of the updates pertain;
   determining updates in the set of updates which pertain to storage objects in the identified set;
   grouping the determined updates as a partition of updates operable for transmission and update, grouping including grouping updates in the set of updates into a partition of related updates, the related updates having changes in common with other updates in the partition such that the related updates result in writes to common database elements wherein the partition includes entries of SAN manageable entities in the same hierarchy according to tree based partitioning and wherein grouping identifies relations between manageable entities and wherein updates resulting in a database modification corresponding to a particular manageable entity result in an update to a related manageable entity, as defined by the relations, the update affecting a common database element, the updates to the related manageable entity operable to be affected in the same database update;
   transmitting each of the partitions independently of the other partitions according to a hierarchy of relations between the manageable entities; and
   updating a SAN managed object database (MODB) using at least one group of partitioned updates.

15. The method of claim 14 further comprising:
   determining if the updates are within a set of storage objects defined by one of the identified groups; and
   grouping updates together according to the relations, related manageable entities causing updates to common database elements, the related updates determined according to a san hierarchy of manageable entities, such that the SAN hierarchy includes mappings of FE adaptors to storage devices, the number of storage devices substantially larger than the number of FE adaptors and common database elements records pertaining to a particular manageable entity.

16. A computer program product having a computer readable storage medium operable to store computer program logic embodied in computer program code encoded thereon that, when executed cause the computer to perform a method for partitioning data in a storage area network (SAN) comprising:

computer program code for identifying update information including a set of updates to management information, the update information pertaining to manageable entities in a storage area network, each update in the set of updates corresponding to at least one manageable entity;

computer program code for identifying groups of manageable entities corresponding to the set of updates;

computer program code for grouping the set of updates into partitions corresponding to the identified groups of manageable entities, each partition including updates affecting database elements corresponding to the manageable entities in a respective identified group, including grouping updates in the set of updates into a partition of related updates, the related updates having changes in common with other updates in the partition such that the related updates result in writes to common database elements wherein the partition includes entries of SAN manageable entities in the same hierarchy according to tree based partitioning and wherein grouping identifies relations between manageable entities and wherein updates resulting in a database modification corresponding to a particular manageable entity result in an update to a related manageable entity, as defined by the relations, the update affecting a common database element, the updates to the related manageable entity operable to be affected in the same database update;

computer program code for transmitting each of the partitions independently of the other partitions according to a hierarchy of relations between the manageable entities; and computer program code for updating related manageable entities in a SAN managed object database (MODB) using at least one group of partitioned updates, further including:

computer program code for performing updates corresponding to a first manageable entity, the update affecting a database element, the first manageable entity having relations to a second manageable entity and a third manageable entity;

computer program code for performing updates corresponding to the second manageable entity; and computer program code for performing updates to the third manageable entity without refetching the database element corresponding to the first manageable entity.

17. The product of claim 9 wherein the agent examines the management information to determine whether the management information is to be grouped into partitions by the partitioner.

18. The method of claim 1 wherein the grouping is performed at a level of the hierarchy as defined by relations such that the same fetch retrieves entries corresponding to both manageable entities of a relation.

\* \* \* \* \*